(12) United States Patent
Chen et al.

(10) Patent No.: US 12,424,957 B1
(45) Date of Patent: Sep. 23, 2025

(54) MEASUREMENT AND CONTROL METHOD, DEVICE, AND ELECTRONIC EQUIPMENT FOR MOTOR CURRENT AND SPEED

(71) Applicant: WUHAN UNIVERSITY OF TECHNOLOGY, Hubei (CN)

(72) Inventors: Linying Chen, Hubei (CN); Yide Ye, Hubei (CN); Yamin Huang, Hubei (CN); Pengfei Chen, Hubei (CN); Mengxia Li, Hubei (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/914,456

(22) Filed: Oct. 14, 2024

(30) Foreign Application Priority Data

Mar. 19, 2024 (CN) .............................. 202410313174

(51) Int. Cl.
*H02P 21/18* (2016.01)
*H02P 21/22* (2016.01)

(52) U.S. Cl.
CPC .............. *H02P 21/18* (2016.02); *H02P 21/22* (2016.02); *H02P 2205/01* (2013.01); *H02P 2205/07* (2013.01)

(58) Field of Classification Search
CPC ...... H02P 21/18; H02P 21/22; H02P 2205/01; H02P 2205/07
See application file for complete search history.

(56) References Cited

U.S. PATENT DOCUMENTS

2021/0126522 A1  4/2021  Hannon et al.

FOREIGN PATENT DOCUMENTS

| CN | 110022105 | A | * | 7/2019 |
| CN | 209844868 | U | * | 12/2019 |
| CN | 112953330 | A |   | 6/2021 |
| CN | 113071508 | A |   | 7/2021 |

(Continued)

OTHER PUBLICATIONS

Nguyen, Explicit Model Predictive Speed Control for Permanent Magnet Synchronous Motor With Torque Ripple Minimization, Dec. 2023, 134199-134210 (Year: 2023).*

(Continued)

*Primary Examiner* — Bickey Dhakal
(74) *Attorney, Agent, or Firm* — HOWARD M COHN and Associates, LLC

(57) ABSTRACT

Disclosed is a measurement and control method, device, and electronic equipment for motor current and speed. The method comprises: obtaining an input speed and an input current, obtaining a motor measurement and control model, inputting the input speed and the input current into a motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current. The method measures the motor speed and current through motor measurement and control model, generates more accurate reference currents, and achieves precise control of the motor.

6 Claims, 4 Drawing Sheets

---

S110 — obtaining an input speed and an input current

S120 — obtaining a motor measurement and control model, inputting the input speed and the input current into the motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current

(56) References Cited

FOREIGN PATENT DOCUMENTS

| | | |
|---|---|---|
| CN | 115694289 A | 2/2023 |
| CN | 117335701 A | 1/2024 |
| CN | 117691895 A | 3/2024 |

OTHER PUBLICATIONS

Notification to Grant Patent Right for Invention, Chinese Application No. 202410313174.7, mailed Sep. 6, 2024 (3 pages).
CNIPA, Office Action issued for Chinese Application No. 202410313174.7, mailed Jul. 19, 2024 (15 pages).
Journal of Jiangnan University (Natural Science Edition), No. 06, Total contents of vol. 11, issue date Dec. 28, 2012.

* cited by examiner

MEASUREMENT AND CONTROL METHOD, DEVICE, AND ELECTRONIC EQUIPMENT FOR MOTOR CURRENT AND SPEED

FIELD OF THE DISCLOSURE

The disclosure relates to the technical field of motor control, in particular to a measurement and control method, device, and electronic equipment for motor current and speed.

BACKGROUND

Electric propulsion technology is replacing traditional fuel propulsion technology due to its advantages of higher efficiency, superior performance, and low-carbon environmental protection. Electric motor is the core component of ship electric propulsion systems, its main types are DC motor, asynchronous motor and synchronous motor. DC motor is suitable for ships in low-speed and high torque situations due to its high torque, good starting and speed regulation performance, and simple control. Asynchronous motor is suitable for small and medium-sized ships due to its simple construction and low maintenance costs. The starting of synchronous motor requires external excitation and is not suitable for ship electric propulsion. The emergence of permanent magnet synchronous motor has changed the situation where synchronous motors are not suitable for ship electric propulsion. It uses permanent magnets to provide excitation without excitation losses, and has a simple structure without collector rings and brushes, which improves the efficiency and reliability of motor operation. Realizing precise control of permanent magnet synchronous motors and bringing new leaps to ship electric propulsion technology.

At present, the most complete and widely used method for controlling permanent magnet synchronous motors is the dual closed-loop PI control. The disadvantage of this method is that the PI control system has hysteresis and poor dynamic performance. Another mainstream approach is sliding mode variable structure control, which has strong robustness, but there may be vibration problems when reaching the sliding mode surface, requiring careful design of control rates to suppress vibration. Adaptive control based on fuzzy algorithms and control based on neural networks have also been applied to permanent magnet synchronous motors, but each has its own shortcomings that urgently need to be addressed. Thanks to the improvement of computer data processing capabilities, model predictive control has been increasingly widely applied in fields such as power, automotive, and aerospace. Model predictive control is based on mathematical model to predict. Firstly, predicting the corresponding output trajectory according to the input state. Then, evaluating the effect of different input states according to the constructed cost function. Finally, carrying out the rolling optimization, that is, the first optimal control quantity is taken as the input, and the optimization process is repeated at the next sampling time. Whether model predictive control can be applied to permanent magnet synchronous motors is a problem that needs to be solved in academia and industry.

In the existing technology, there is a lack of motor measurement and control model to measure the motor speed and current to generate more accurate reference current, so as to achieve accurate control of the motor.

SUMMARY

The purpose of this disclosure is to provide a measurement and control method, device, and electronic equipment for motor current and speed to measure the motor speed and current to generate more accurate reference current, so as to achieve accurate control of the motor.

In order to solve the above technical problems, this disclosure provides a motor current and speed measurement and control method, comprising:

obtaining an input speed and an input current;

obtaining a motor measurement and control model, inputting the input speed and the input current into the motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current;

wherein, inputting the input speed and input current into the motor measurement and control model for measurement operation to obtain a current motor speed, comprising:

inputting the input speed and the input current into the motor measurement and control model for deviation definition, correction, and cost function measurement operation design, to obtain the current motor speed;

obtaining a motor explicit control rate, and conducting a current calculating based on the current motor speed and the input speed under the motor explicit control rate to obtain a reference current, comprising:

the motor measurement control model is based on motor torque equation, and after ignoring the load torque term in the equation, Laplace transform is performed to obtain a transfer function of speed and quadrature-axis current; discretizing the transfer function to obtain a difference equation for preliminary calculation of the cross-axis reference current; the constructed cost function consists of motor speed and quadrature-axis current; considering that the structure of the difference equation is not conducive to multi-step prediction, only one step prediction is performed to obtain the optimal quadrature-axis current; due to the use of direct-axis current as zero control, the obtained quadrature-axis and direct-axis currents serves as the reference current for current prediction control;

the formula for calculating the explicit control rate of the motor is as follows:

$$\Delta i_q(k) = -\frac{\lambda a}{\lambda a^2 + \mu}[(1-b)\omega_m(k) + b\omega_m(k-1) + \tilde{\omega}_m(k) - \omega^*(k+1)];$$

where, $\Delta i_q$ is the current increment at the current moment, k is the moment, K is the weight of the current motor speed, a is the first coefficient of the subsequent differential equation, b is the second coefficient of the subsequent differential equation, $\omega_m$ is the current motor speed, $\tilde{w}_m$ is the predicted deviation of the current motor speed, $\omega^*$ is the input speed, and μ is the weight of the current increment at the current moment.

This disclosure also provides a measurement and control device for motor current and speed, comprising:

an acquisition module, which is used to obtain an input speed and an input current;

a measurement and control module, which is used for obtaining the motor measurement and control model, inputting the input speed and the input current into a motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current;

wherein, inputting the input speed and input current into the motor measurement and control model for measurement operation to obtain a current motor speed, comprising:

inputting the input speed and the input current into the motor measurement and control model for deviation definition, correction, and cost function measurement operation design, to obtain the current motor speed;

obtaining a motor explicit control rate, and conducting a current calculating based on the current motor speed and the input speed under the motor explicit control rate to obtain a reference current, comprising:

the motor measurement control model is based on motor torque equation, and after ignoring the load torque term in the equation, Laplace transform is performed to obtain a transfer function of speed and quadrature-axis current; discretizing the transfer function to obtain a difference equation for preliminary calculation of the cross-axis reference current; the constructed cost function consists of motor speed and quadrature-axis current; considering that the structure of the difference equation is not conducive to multi-step prediction, only one step prediction is performed to obtain the optimal quadrature-axis current; due to the use of direct-axis current as zero control, the obtained quadrature-axis and direct-axis currents serves as the reference current for current prediction control.

the formula for calculating the explicit control rate of the motor is as follows:

$$\Delta i_q(k) = -\frac{\lambda a}{\lambda a^2 + \mu}[(1-b)\omega_m(k) + b\omega_m(k-1) + \omega_m^\sim(k) - \omega^*(k+1)];$$

where, $\Delta i_q$ is the current increment at the current moment, $\lambda$ is the moment, $\lambda$ is the weight of the current motor speed, a is the first coefficient of the subsequent differential equation, b is the second coefficient of the subsequent differential equation, $\omega_m$ is the current motor speed, $\omega_m^\sim$ is the predicted deviation of the current motor speed, $\omega^*$ is the input speed, and $\mu$ is the weight of the current increment at the current moment.

This disclosure also provides an electronic device, which comprises a memory and a processor, wherein:

the memory is used for storing programs;

the processor, coupled to the memory, is used to execute the program stored in the memory to implement the steps of a measurement and control method for motor current and speed.

This disclosure also provides a non-transient computer-readable storage medium, which stores a computer program, when the computer program is executed by a processor, the steps of the motor current and speed measurement and control method are implemented.

Compared with existing technologies, the beneficial effect of this disclosure is: the method measures the motor speed and current through motor measurement and control model, generates more accurate reference currents, and achieves precise control of the motor.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of the application.

This disclosure provides a measurement and control method, device, and electronic equipment for motor current and speed, which will be explained separately below.

Figure 1:
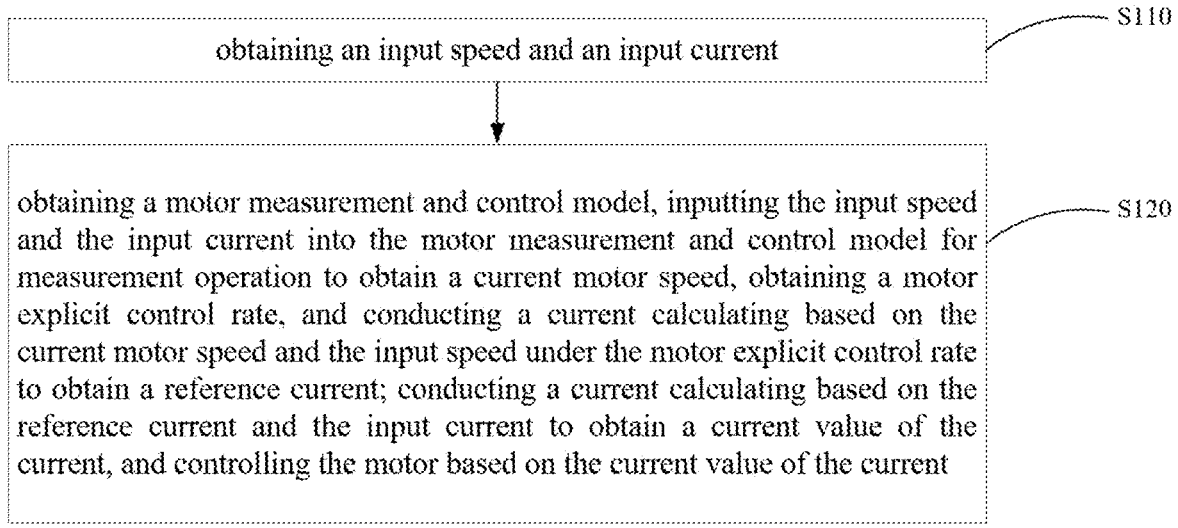
FIG. 1 is a flowchart of an embodiment of the measurement and control method for motor current and speed provided by this disclosure.
Figure 2:
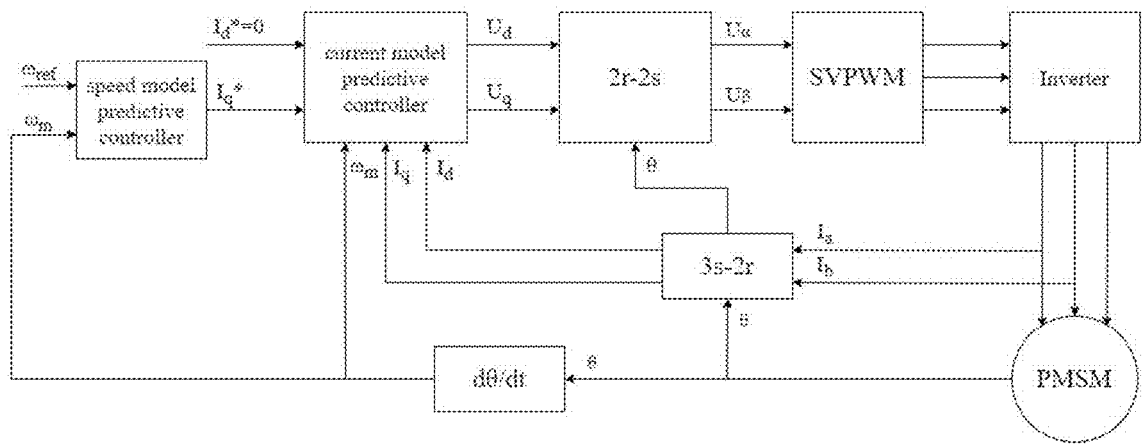
FIG. 2 is a schematic diagram of an embodiment of the motor measurement and control model for the measurement and control method for motor current and speed provided by this disclosure.

FIG. 1 is a flowchart of an embodiment of the measurement and control method for motor current and speed provided by this disclosure. FIG. 2 is a schematic diagram of the motor measurement and control model of an embodiment of the measurement and control method for motor current and speed provided by this disclosure.

The measurement and control method for motor current and speed comprises:

S110, obtaining an input speed and an input current;

S120, obtaining a motor measurement and control model, inputting the input speed and the input current into the motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current.

In this embodiment, the motor measurement and control model comprises a current model controller.

The current model controller is used for Deadbeat Tracking Control based on the current value of the current to obtain the voltage value applied at the current moment controller output by the current controller; based on SVPWM algorithm, the voltage value applied at the current moment is modulated to obtain a switch control signal, which is then applied to an inverter to achieve control operation for the motor.

In this embodiment, the measurement of current and speed, as well as the control operation for the motor, are mainly carried out through the motor measurement control model. The motor measurement control model is based on the motor torque equation, and after ignoring the load torque term in the equation, Laplace transform is performed to obtain a transfer function of speed and quadrature-axis current. Discretizing the transfer function to obtain a difference equation for preliminary calculation of the cross-axis reference current. The constructed cost function consists of motor speed and quadrature-axis current. Considering that the structure of the difference equation is not conducive to multi-step prediction, only one step prediction is performed to obtain the optimal quadrature-axis current. Due to the use of direct-axis current as zero control, the obtained quadrature-axis and direct-axis currents serves as the reference current for current prediction control.

Due to the mathematical model of motor speed and current ignoring load torque during Laplace transform, and the existence of linearization errors and time-varying parameters in the motor model affecting control performance, the final result of these effects is the deviation between the actual motor speed and the predicted motor speed. Therefore, this deviation is used to correct the predicted motor speed and obtain the optimal quadrature-axis current of the cost function. The specific calculation formula is as follows:

The expression for the torque equation of a permanent magnet synchronous motor is as follows:

$$T_e = J\frac{d\omega_m}{dt} + B\omega_m + T_1;$$

where, $T_e$ is an electromagnetic torque, $T_1$ is a load torque, is the moment of inertia of the motor rotor, and $\omega_m$ is the motor speed;

Furthermore, the expression for electromagnetic torque is as follows:

$$T_e = \frac{3}{2}n_p[\Psi_f i_q + (L_d - L_q)i_d i_q] = \frac{3}{2}n_p\Psi_f i_q;$$

where, $n_P$ is the number of pole pairs of the motor, $\Psi^f$ is the rotor magnetic flux vector, $L_d$ is the direct axis inductance of the motor, $L_q$ is the cross-axis inductance of the motor, $i_d$ is the direct-axis current of the motor, and $i_q$ is the quadrature-axis current of the motor;

Furthermore, the expression of the transfer function of Laplace transform is as follows:

$$G(s) = \frac{w_m(s)}{I_q(s)} = \frac{K_m}{J_s + B};$$

where, $W_m(s)$ is the motor speed $\omega_m$ transformed by Laplace transform, $I_q(s)$ is the motor's quadrature-axis current transformed by Laplace transform, J is the moment of inertia of the motor rotor, B is the damping coefficient, and $K_m$ is $1.5n_p\Psi_f$; performing Laplace transform without considering load torque to obtain the transfer function;

Furthermore, the expression of the Z-domain discrete transfer function is as follows:

$$G(z) = Z\left[\frac{1-e^{-T_S}}{s} \cdot \frac{K_m}{J_s + B}\right] = \frac{az^{-1}}{1 + bz^{-1}};$$

Furthermore, the coefficient of the difference equation are expressed as follows:

$$a = \frac{K_m\left(1 - e^{-\frac{T_s B}{J}}\right)}{B}, b = -e^{\frac{-T_s B}{J}};$$

Furthermore, the expression of the difference equation derived from G (z) is as follows:

$$\begin{pmatrix} \omega_m(k) = ai_q(k-1) - b\omega_m(k-1) \\ \omega_m(k+1) = ai_q(k) - b\omega_m(k) \end{pmatrix};$$

wherein, assuming the current time is time k, k+1 is the next time, and k−1 is the previous time, the purpose of deriving the differential equation is to obtain the relationship between the quadrature-axis current and the motor speed;

Furthermore, the expression for the relationship between the increment of quadrature-axis current and motor speed is as follows:

$$\omega_m(k+1) = a\Delta i_q(k) + (1-b)\omega_m(k) + b\omega_m(k-1);$$

wherein, since the mathematical model does not consider the load torque, the mathematical relationship between time k and time k+1 cannot be directly used. It is necessary to obtain the relationship between the increment of the quadrature-axis current and the motor speed by differentiating the upper and lower equations.

In this embodiment, the schematic diagram of the motor measurement and control model is shown in FIG. 2. In the speed model predictive controller, $\omega_{ref}$ is the artificially given reference input, $\omega_m$ is the actual motor speed, and the output $I^*_q$ is the cross-axis reference current output by the controller. The input of the current model predictive controller includes: quadrature axis reference current $I^*_q$, direct-axis reference current $I^*_d$, motor actual speed $\omega_m$, motor quadrant-axis current is $I_q$, and motor actual direct-axis current $I^*_d$. The output of the controller includes: the quadrant-axis voltage $U_q$ and direct-axis voltage $U_d$. 2r-2s represents the transformation from a two-phase rotating coordinate system (dq coordinate system) to a two-phase stationary coordinate system (αβ coordinate system), which requires measuring the rotor electrical angle θ of the motor. The quadrature-axis voltage $U_q$ and direct-axis voltage $U_d$ are transformed to obtain $U_\alpha$ and $U_\beta$, which are used as input signals for SVPWM (Space Vector Modulation) and converted into switch signals for the inverter to control the motor. 3s-2r represents the transformation from a three-phase stationary coordinate system (abc coordinate system)

to a two-phase rotating coordinate system (dq coordinate system), and dθ/dt represents the differentiation of angle with respect to time.

In an embodiment, inputting the input speed and input current into the motor measurement and control model for measurement operation to obtain a current motor speed, comprising:
inputting the input speed and the input current into the motor measurement and control model for deviation definition, correction, and cost function measurement operation design, to obtain the current motor speed.

In one embodiment, the expression for deviation definition is as follows:

$$\omega_m\tilde{}(k)=\omega_m(k)-\omega_m\hat{}(k);$$

where, a $\omega_m\tilde{}(k)$ is the predicted deviation at time k, k is time, $\omega_m(k)$ is the motor speed at time k, and $\omega_m\hat{}(k)$ is the predicted motor speed at time k.

Furthermore, the expression for predicting the motor speed after correcting the deviation is as follows:

$$\omega_{mp}(k+1)=\omega_m(k+1)+\omega_m\tilde{}(k);$$

In this embodiment, the predicted motor speed at time k+1 after correcting the deviation is as described above.

In an embodiment, the expression of the cost function is as follows:

$$J=\lambda[\omega_{mp}(k+1)-\omega^*(k+1)]^2+\lambda[\Delta i_q(k)]^2$$

where, J is the cost function, λ is the weight of the current motor speed, ω* is the input speed, μ is the weight of the current increment at the current time, k is the time, $\omega_{mp}$ is the motor speed after correcting the deviation, and $\Delta i_q$ is the current increment at the current time.

Furthermore, the expression for the input speed is as follows:

$$\omega^*(k+1)=a\omega_{mp}(k)+(1-a)\omega_{ref}(k);$$

where, $\omega_{ref}(k)$ is the input speed;

In this embodiment, during the control process, it is hoped that the predicted speed after correcting the deviation will be as close as possible to the reference speed, and at the same time, it is hoped that the incremental change can be controlled smoothly. Therefore, the cost function is designed.

In an embodiment, the formula for calculating the explicit control rate of the motor is as follows:

$$\Delta i_q(k) = -\frac{\lambda a}{\lambda a^2 + \mu}[(1-b)\omega_m(k) + b\omega_m(k-1) + \omega_m\tilde{}(k) - \omega^*(k+1)];$$

where, $\Delta i_q$ is the current increment at the current moment, k is the moment, λ is the weight of the current motor speed, a is the first coefficient of the subsequent differential equation, b is the second coefficient of the subsequent differential equation, $\omega_m$ is the current motor speed, $\omega_m\tilde{}$ is the predicted deviation of the current motor speed, ω* is the input speed, and is the weight of the current increment at the current moment.

Furthermore, the expression for the reference value of the quadrature-axis current at time k is as follows:

$$i^*_q(k)=i^*_q(k-1)+\Delta i_q(k);$$

where, $i^*_q(k)$ is the reference value of the quadrature-axis current at time k, $i^*_q(k-1)$ is the reference value of the quadrature-axis current at time k−1, and $\Delta i_q(k)$ is the explicit control rate of the motor.

In this embodiment, the reference value of the quadrature-axis current at time k is used for deadbeat current prediction control.

In an embodiment, the motor measurement and control model comprises a current model controller;
the current model controller is used for Deadbeat Tracking Control based on the current value of the current to obtain the output of the current controller;
modulating the output of the current controller based on the SVPWM algorithm to obtain a control signal, and control the motor based on the control signal.

In this embodiment, for the current model controller, based on the basic idea of Deadbeat Tracking Control, the current value at the current moment is sampled, and the current model controller is used to predict the voltage value applied at the current moment, so that the current at the next sampling moment can track the current setpoint without beat. The calculated voltage is modulated by SVPWM to generate the required switch signal for the inverter to control the motor. The specific calculation process is as follows:

The expression for the current value at the sampling time of k+1 is as follows:

$$\begin{cases} i_d(k+1) = i^*_d(k) \\ i_q(k+1) = i^*_q(k) \end{cases};$$

where, $i_d$ is the direct-axis current, $i_q$ is the quadrature-axis current, and $i^*_q$ is the reference value for quadrature-axis current.

In this embodiment, based on the basic idea of deadbeat current prediction control, the current value at the k-th time is sampled, and the current model controller is used to predict the voltage value applied at the current time, so that the current at the k+1-th sampling time can track the current setpoint at the k-th time. The direct-axis current is served as zero control, that is, $i^*_d=0$.

Figure 3:
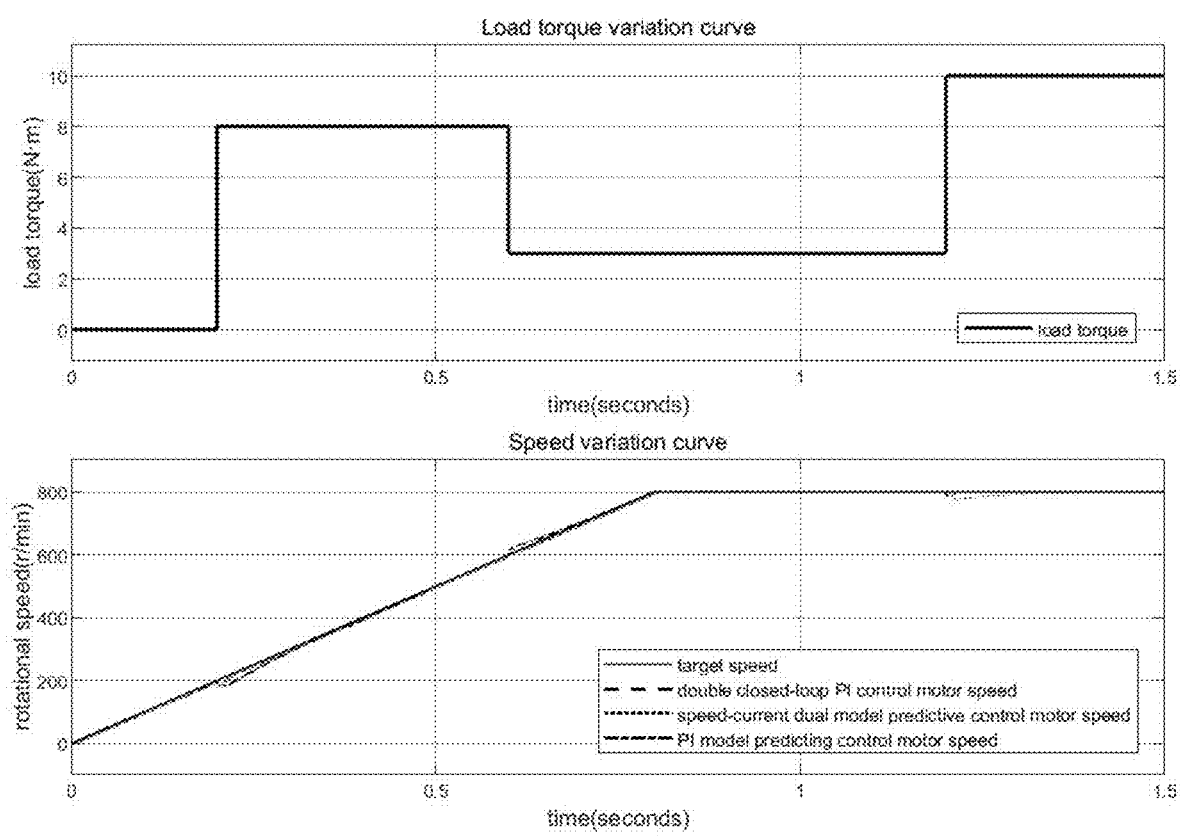
FIG. 3 is the variation curve of speed and load for an embodiment of the measurement and control method for motor current and speed provided by this disclosure.
Figure 4:
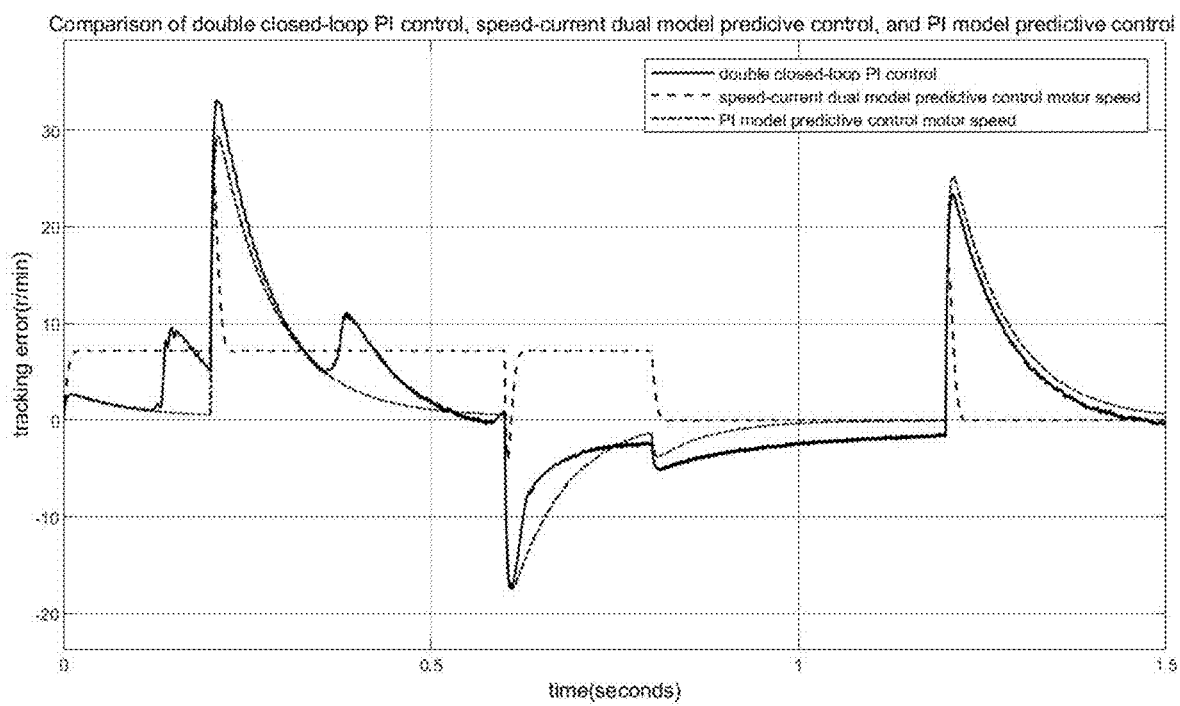
FIG. 4 is a comparison of tracking error curves for an embodiment of the measurement and control method for motor current and speed provided by this disclosure.

FIG. 3 shows the variation curves of the speed and load of an embodiment of the measurement and control method for motor current and speed provided by this disclosure, and FIG. 4 compares the tracking error curves of an embodiment of the measurement and control method for motor current and speed provided by this disclosure, wherein:

The expression of the current model controller is as follows:

$$x(k+1)=A(k)x(k)+Bu(k)+D(k);$$

where, x(k+1) is the mathematical model of the current model controller, A(k) is the system matrix of the current model controller, x(k) is the system state variable of the current model controller, B is the control matrix of the current model controller, u(k) is the system control input of the current model controller, D(k) is the disturbance term of the current model controller, and k is the time.

Furthermore, the expression for system state variables is as follows:

$$x(k) = \begin{bmatrix} i_d(k) \\ i_q(k) \end{bmatrix};$$

Furthermore, the expression for the system control input quantity is as follows:

$$u(k) = \begin{bmatrix} u_d(k) \\ u_q(k) \end{bmatrix};$$

Furthermore, the expression of the system matrix is as follows:

$$A(k) = \begin{bmatrix} 1 - T_s\dfrac{R_s}{L_s} & T_s\omega_e(k) \\ -T_s\omega_s(k) & 1 - T_s\dfrac{R_s}{L_s} \end{bmatrix};$$

Furthermore, the expression of the control matrix is as follows:

$$B = \begin{bmatrix} \dfrac{T_s}{L_s} & 0 \\ 0 & \dfrac{T_s}{L_s} \end{bmatrix};$$

Furthermore, the expression for the perturbation term is as follows:

$$D(k) = \begin{bmatrix} 0 \\ -\dfrac{\psi_f}{L_s}T_s\omega_e(k) \end{bmatrix};$$

In this embodiment, the deadbeat current prediction control calculates the voltage and generates the required switch signal through SVPWM modulation to act on the inverter, achieving control of the motor.

In this embodiment, in the accuracy evaluation of the method, the difference between the actual motor speed and the target speed is defined as the tracking error, which serves as the basis for accuracy evaluation; On the time scale of the method, the length of time that approaches zero due to tracking errors is used as the basis for evaluating the time scale. The change curves of the same target speed and load speed are shown in FIG. 3 through dual closed-loop PI control, PI model predictive control, and motor measurement and control model.

In this embodiment, the designed motor measurement and control model can maintain the tracking error at a stable and small value when given a target speed change. Due to the use of one-step prediction, the obtained quadrature-axis current and voltage are local optimal values, which cannot reduce tracking error to zero during speed changes. But after the target speed remains constant, the motor measurement and control model can quickly maintain the tracking error to zero. The designed motor measurement and control model has superior performance when the load torque changes. It can significantly reduce the tracking deviation when the load torque changes, and also quickly maintain the tracking deviation at a stable value.

Figure 5:
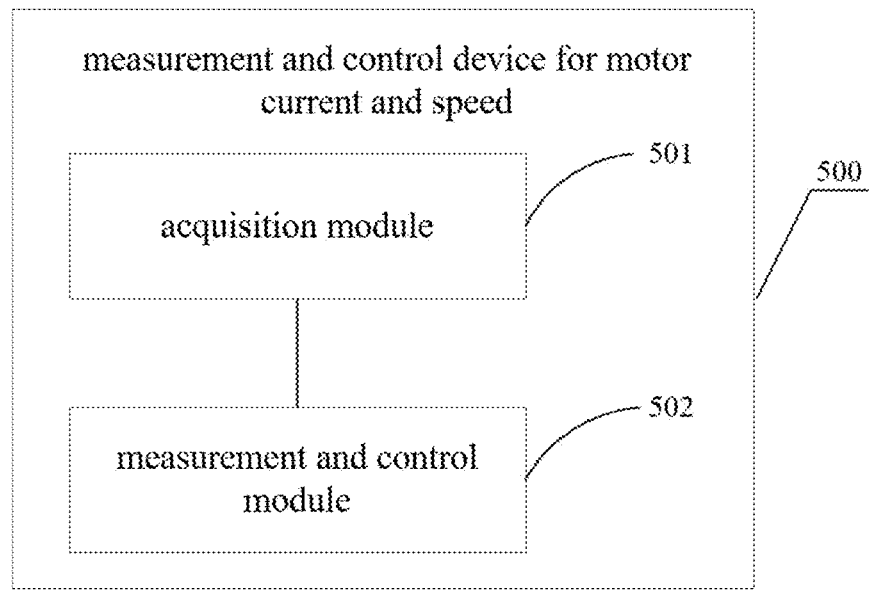
FIG. 5 is a schematic diagram of the structure of an embodiment of the measurement and control device for motor current and speed provided by this disclosure.

FIG. 5 is a schematic diagram of the structure of an embodiment of the measurement and control device for motor current and speed provided by this disclosure, comprising:

an acquisition module 501, which is used to obtain an input speed and an input current;

a measurement and control module 502, which is used for obtaining the motor measurement and control model, inputting the input speed and the input current into a motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current.

The above embodiment provides a measurement and control device for motor current and speed, which can implement the technical solution described in the above embodiment of the measurement and control method for motor current and speed. The specific implementation principles of each module or unit can be found in the corresponding content of the above embodiment of the measurement and control method for motor current and speed, and will not be repeated here.

Figure 6:
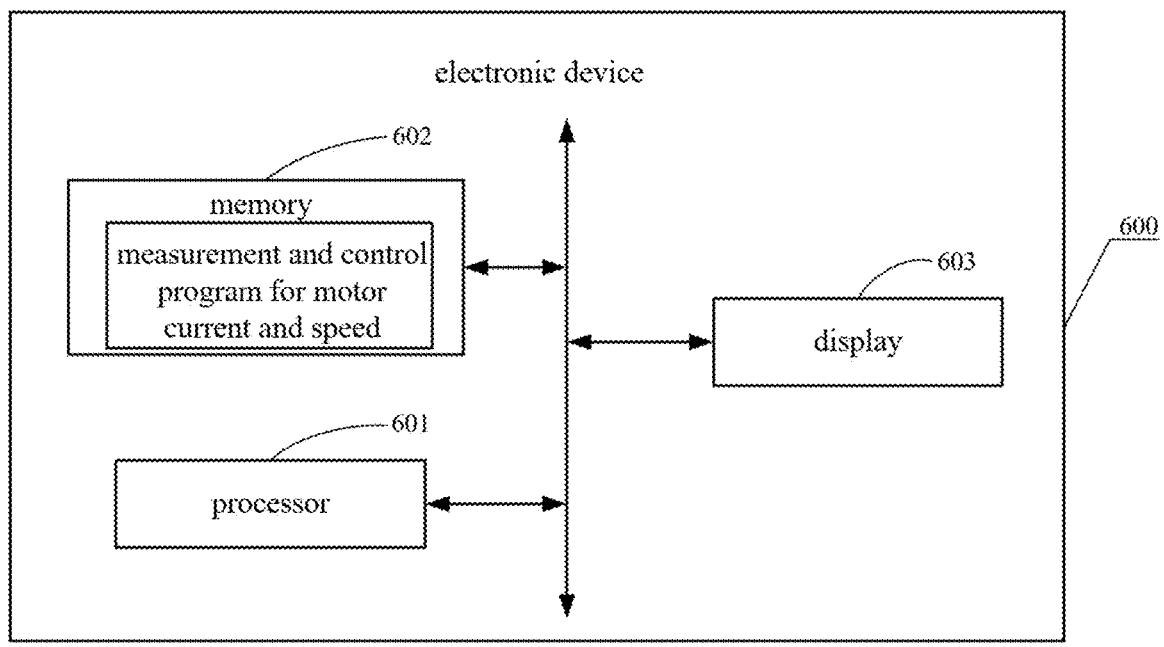
FIG. 6 is a schematic diagram of the structure of an embodiment of the electronic device provided by this disclosure.

As shown in FIG. 6, this disclosure also provides an electronic device 600 accordingly. The electronic device 600 comprises a processor 601, a memory 602, and a display 603. FIG. 6 only shows some components of the electronic device 600, but it should be understood that implementing all of the shown components is not required, and more or fewer components may be implemented instead.

In some embodiments, the memory 602 may be an internal storage unit of the electronic device 600, such as a hard disk or memory of the electronic device 600. In other embodiments, the memory 602 may also be an external storage device of the electronic device 600, such as a plug-in hard drive, a Smart Media Card (SMC), a Secure Digital (SD) card, a Flash Card, etc. equipped on the electronic device 600.

Furthermore, the memory 602 may also include both internal storage units of the electronic device 600 and external storage devices. The memory 602 is used to store application software and various data for installing electronic device 600.

comparison of double closed loop PI control, PI model predictive control, and torque current dual model predictive control In some embodiments, the processor 601 may be a Central Processing Unit (CPU), microprocessor, or other data processing chip used to run program code or process data stored in memory 602, such as a measurement and control method for motor current and speed in this disclosure.

In some embodiments, the display 603 may be an LED display, a liquid crystal display, a touch sensitive liquid crystal display, or an OLED (Organic Light Emitting Diode) touch sensor. The display 603 is used to display information on electronic device 600 and to display a visual user interface. The components 601-603 of the electronic device 600 communicate with each other through system bus.

In some embodiments of this disclosure, when the processor 601 executes the measurement control program for motor current and speed in the memory 602, the following steps can be implemented:

obtaining an input speed and an input current;

obtaining a motor measurement and control model, inputting the input speed and the input current into the motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current.

It should be understood that when the processor 601 executes the measurement and control program for motor current and speed in the memory 602, in addition to the above functions, it can also achieve other functions, as described in the corresponding method embodiments mentioned earlier.

Furthermore, this disclosure implementation does not impose specific limitations on the types of the electronic devices 600 mentioned. The electronic devices 600 can be portable electronic devices such as mobile phones, tablets, personal digital assistants (PDAs), wearable devices, laptops, etc. Exemplary embodiments of portable electronic devices include but are not limited to portable electronic devices equipped with IOS, Android, Microsoft, or other operating systems. The above-mentioned portable electronic devices can also be other portable electronic devices, such as laptops with touch sensitive surfaces (such as touch panels). It should also be understood that in some other embodiments of this disclosure, the electronic device 600 may not be a portable electronic device, but a desktop computer with a touch sensitive surface (such as a touch panel).

On the other hand, this disclosure also provides a non-transient computer-readable storage medium on which a computer program is stored. When the computer program is executed by a processor, it implements a measurement and control method for motor current and speed provided by the above methods. The method includes:

obtaining an input speed and an input current;

obtaining a motor measurement and control model, inputting the input speed and the input current into the motor measurement and control model for measurement operation to obtain a current motor speed, obtaining a motor explicit control rate, and conducting a current calculating based on the current motor speed and the input speed under the motor explicit control rate to obtain a reference current; conducting a current calculating based on the reference current and the input current to obtain a current value of the current, and controlling the motor based on the current value of the current.

Technicians in this field can understand that all or part of the process of implementing the above embodiments can be completed by instructing relevant hardware through computer programs, which can be stored in computer-readable storage media. Among them, computer-readable storage media include magnetic disks, optical disks, read-only storage memory, or random-access memory.

The above provides a detailed introduction to the auxiliary decision-making methods and devices for illegal fishing incidents provided by this disclosure. This disclosure applies specific examples to explain the principles and implementation methods. The above embodiments are only used to help understand the methods and core ideas of this disclosure; Meanwhile, for technical personnel in this field, there may be changes in specific implementation methods and application scope based on the concept of this disclosure. In summary, the content of this manual should not be understood as a limitation on this disclosure.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measurement and control method for motor current and speed, comprising:

obtaining an input speed and an input current of a motor;

obtaining a motor measurement and control model, inputting the input speed and the input current into the motor measurement and control model for measurement operation to obtain a current motor speed, wherein the measurement operation comprises deviation definition, correction, and designing a cost function;

obtaining a motor explicit control rate, and conducting a current calculating based on the current motor speed and the input speed under the motor explicit control rate to obtain a reference current;

conducting a current calculating based on the reference current and the input current to obtain a current value of the current, and controlling the motor based on the current value of the current;

wherein, obtaining the motor explicit control rate, and conducting the current calculating based on the current motor speed and the input speed under the motor explicit control rate to obtain the reference current, comprising:

the motor measurement control model performing Laplace transform on motor torque equation to obtain a transfer function of the current motor speed and quadrature-axis current of the input current;

discretizing the transfer function to obtain a difference equation for preliminary calculation of quadrature-axis current of the reference current;

constructing the cost function according to the current motor speed and the quadrature-axis current of the reference current;

performing one step prediction to obtain an optimal quadrature-axis current by the cost function; and by using direct-axis current of the reference current as zero control, obtaining quadrature-axis and direct-axis currents serves as the reference current for current prediction control based on the optimal quadrature-axis current and the motor explicit control rate;

the formula for calculating the explicit control rate of the motor is as follows:

$$\Delta i_q(k) = -\frac{\lambda a}{\lambda a^2 + \mu}[(1-b)\omega_m(k) + b\omega_m(k-1) + \omega_m^\sim(k) - \omega^*(k+1)];$$

where, $\Delta i_q$ is the current increment at the current moment, k is the moment, $\lambda$ is the weight of the current motor speed, a is the first coefficient of the subsequent differential equation, b is the second coefficient of the subsequent differential equation, $\omega_m$ is the current motor speed, $\omega_m^\sim$ is a predicted deviation of the current motor speed, $\omega^*$ is the input speed, and is the weight of the current increment at the current moment;

wherein, the motor measurement and control model comprises a current model controller;

the current model controller is used for Deadbeat Tracking Control based on the current value of the current to obtain an output of the current controller;

modulating the output of the current model controller based on a SVPWM algorithm to obtain a control signal, and control the motor by applying the control signal to an inverter electrically connected to the current model controller.

2. The measurement and control method for motor current and speed according to claim 1, the expression for deviation definition is as follows:

$$\omega_m^-(k)=\omega_m(k)-\omega_m^\wedge(k);$$

where, $\omega_m^-(k)$ is a predicted deviation at time k, k is time, $\omega_m(k)$ is the motor speed at time k, and $\omega_m^\wedge(k)$ is a predicted motor speed at time k.

3. The measurement and control method for motor current and speed according to claim 1, the expression of the cost function is as follows:

$$J=\lambda[\lambda(k+1)-\omega^*+(k+1)]^2+\mu[\Delta i_q(k)]^2$$

where, J is the cost function, λ is the weight of the current motor speed, ω* is the input speed, μ is the weight of the current increment at the current time, k is the time, $\omega_{mp}$ is the motor speed after correcting the deviation, and $\Delta i_q$ is the current increment at the current time.

4. The measurement and control method for motor current and speed according to claim 1, the expression of the current model controller is as follows:

$$x(k+1)=A(k)\times(k)+Bu(k)+D(k);$$

where, x(k+1) is the mathematical model of the current model controller, A(k) is the system matrix of the current model controller, x(k) is the system state variable of the current model controller, B is the control matrix of the current model controller, u(k) is the system control input of the current model controller, D(k) is the disturbance term of the current model controller, and k is the time.

5. An electronic device, which comprises a memory and a processor, wherein:
the memory is used for storing programs;
the processor, coupled to the memory, is used to execute the program stored in the memory to implement the steps of the measurement and control method for motor current and speed as claimed in claim 1.

6. A non-transient computer-readable storage medium, which stores a computer program, when the computer program is executed by a processor, the steps of the motor current and speed measurement and control method as claimed in claim 1 are implemented.

* * * * *